S. RICE.
TIRE.
APPLICATION FILED MAR. 13, 1920.

1,398,574.

Patented Nov. 29, 1921.

Stephen Rice
Inventor by Philip A. H. Terrell
his
Attorney

UNITED STATES PATENT OFFICE.

STEPHEN RICE, OF OMAHA, NEBRASKA.

TIRE.

1,398,574.      Specification of Letters Patent.      Patented Nov. 29, 1921.

Application filed March 13, 1920. Serial No. 365,479.

*To all whom it may concern:*

Be it known that I, STEPHEN RICE, a citizen of the United States, residing at Omaha, in the county of Douglas and State of Nebraska, have invented certain new and useful Improvements in Tires, of which the following is a specification.

My invention relates to improvements in tires, and the object of my invention is the provision of a tire which can be made very cheaply, which will possess the necessary resiliency, which can be easily applied and removed, and which from every point will prove efficient, desirable and practical.

With this object in view my invention consists of a tire embodying novel features of construction and combination of parts, substantially as shown, described and particularly defined by the claim.

Figure 1:
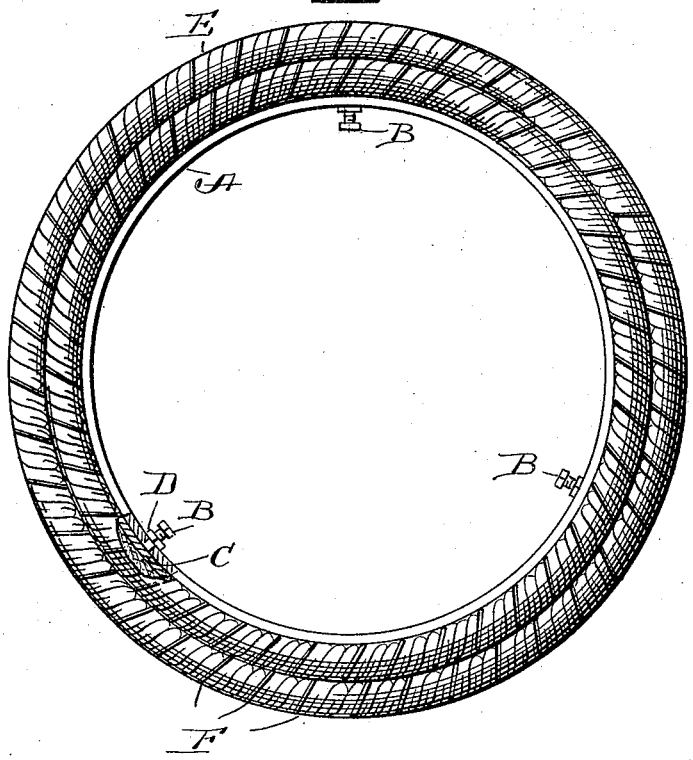
Figure 1 is a side view of a tire constructed in accordance with and embodying my invention, partly broken away to show the means for tightening or taking up wear upon the tire.
Figure 2:
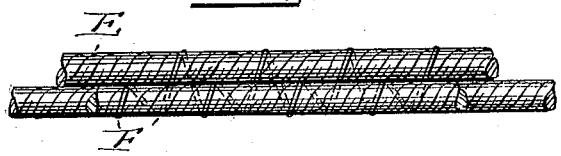
Fig. 2 is a side view of a portion of the tire, showing the arrangement of the strands and the manner of binding them.
Figure 3:
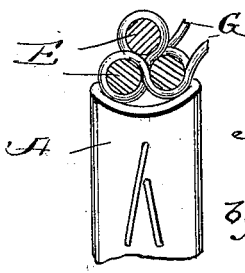
Fig. 3 is a transverse sectional view.

The tire may be used upon any character of vehicle where it would properly serve its purpose but is designed for use in connection with the wheels using a channeled rim A, in which at proper places are mounted the adjusting or tightening screws B, which have their concealed or outer ends connected with plate C, and have upon their threaded portions the jam nuts D, this construction causing the plates to bear upon and take up any slack or wear upon the tire and cause the tire to be at all times firm and taut.

The tire proper is of peculiar construction and fits in the channel of the rim, consisting of a series of ropes E, preferably three being used as shown, which are arranged to form a complete tire of the necessary shape, the strands of the rope being bound closely together by the binding cord or wire F, which passes in and out of the strands of rope as shown, the free ends G, being twisted together and turned in or under the tire body thus formed, the whole making a complete rope tire with wire evenly and closely wound upon and securing the strands into a compact, strong, light and durable tire.

In the event of the tire becoming loose or slack the screws are operated to force the plates against the tire and draw the same firm upon the rim.

Two of the ropes E are located adjacent each other and are of equal diameter, also are located between the spaced flanges of an automobile rim. The other rope E surrounds the pair of ropes E and is disposed equally spaced from the centers of said ropes which are of equal diameter. All of the ropes being securely laced together by a continuous lacing, which lacing forms means for preventing circumferential creeping of the ropes E in relation to each other.

I claim:

The combination with a wheel rim having spaced flanges of a tire body carried by said rim, said tire body comprising a pair of annular pliable members of equal diameter and disposed adjacent each other and between the spaced flanges of the rim, an annular pliable member surrounding the pair of pliable members and disposed equally spaced from the peripheries of the pair of pliable members, said pliable members being round in cross section, and a continuous lacing extending around the pliable members and binding them together, said lacing forming means for preventing circumferential creeping of the annular members in relation to each other.

In testimony whereof I affix my signature.

STEPHEN RICE.